United States Patent [19]
Britton et al.

[11] 4,145,158
[45] Mar. 20, 1979

[54] DIAPHRAGM CLOSURE SUPPORT SYSTEM

[75] Inventors: Fred G. Britton, Bedford; Murl R. Richardson, Fort Worth; Robert J. von Bose, Arlington, all of Tex.

[73] Assignee: Oil States Rubber Co., Arlington, Tex.

[21] Appl. No.: 901,457

[22] Filed: May 1, 1978

[51] Int. Cl.² .............................................. E02D 5/52
[52] U.S. Cl. ...................................... 405/208; 138/89
[58] Field of Search ................... 61/86, 94, 98, 89, 63; 138/89, 93; 137/488; 61/112; 294/86.24

[56] References Cited
U.S. PATENT DOCUMENTS

| | | | |
|---|---|---|---|
| 3,537,483 | 11/1970 | Teague, Jr. | 138/93 |
| 4,047,391 | 9/1977 | Mayfield et al. | 61/98 |
| 4,077,435 | 3/1978 | Van Scoy | 138/89 X |

Primary Examiner—Jacob Shapiro
Attorney, Agent, or Firm—Gerald G. Crutsinger; Larry B. Dwight

[57] ABSTRACT

A diaphragm closure support system connectable to the inside of a pipe adjacent a diaphragm closure on the end of the pipe to prevent rupture of the diaphragm closure by hydrostatic pressure when the pipe is submerged in water. A diaphragm closure support ring having slots formed therein is welded to the inside of the lower end of the pipe. A diaphragm support plate, slightly smaller than the inside diameter of the support ring, is positioned to engage the resilient diaphragm closing the end of the pipe. A plurality of T-bolts are pivotally secured to the support plate and positioned to extend into the slots in a support ring. A T-bolt retraction ring is moveably secured to the support plate and positioned to urge the T-bolts into a locked position in the slots in the support ring. An upward force on the retraction ring initially unlocks the T-bolts from the slots in the support ring and subsequent movement disengages the T-bolts from the slots to permit movement of the diaphragm closure support through the pipe while leaving the diaphragm closure positioned on the end of the pipe.

8 Claims, 5 Drawing Figures

DIAPHRAGM CLOSURE SUPPORT SYSTEM

BACKGROUND OF INVENTION

The apparatus described herein is a diaphragm closure support system particularly adapted for use in conjunction with a rupturable seal assembly for piling guides disclosed in U.S. Pat. No. 3,533,241 to Bowerman, et al, entitled "Rupturable Seal Assembly for Piling Guides."

Offshore drilling platforms are generally supported by towers constructed of prefabricated sections secured together. The offshore drilling platform support structure generally comprises a base which is anchored by pilings to the ocean floor. A typical support structure has a plurality of main leg sections and if employed as a base section which is to be anchored to the ocean floor, the section will be supplied with piling guides comprising pipe having an outside diameter of for example six to seven feet.

A diaphragm of the type disclosed in U.S. Pat. No. 3,533,241 is employed for closing ends of piling guides and main leg sections so that the prefabricated section of the support structure can be floated to the drilling site. Since main leg sections and piling guides on a prefabricated section of a support structure may have an inside diameter of several feet and may be submerged, for example, 1,000 ft. below the surface of water and exposed to hydrostatic pressures in excess of 650 psi, it has been found that the rupturable diaphragm may rupture prematurely or be deformed to the extent that water may flow into the pipe.

When the diaphragm closure support system is employed for reinforcing a diaphragm closing the lower end of a piling guide, the diaphragm closure support mechanism should be removeable from the piling guide to permit movement of a piling through the piling guide to rupture the diaphragm when a piling is being driven into the ocean floor.

Heretofore, reinforcing devices have been employed in conjunction with sealing diaphragms for reinforcement. Typical sealing devices for closing pipes are disclosed in the following U.S. Pat. Nos. 3,483,895; Pat. No. 3,537,483; Pat. No. 3,672,403; Pat. No. 3,747,541; and Pat. No. 3,942,560. These devices generally relate to sealing devices used in pipelines of much smaller diameter than piling guides and require removal of the sealing device and the support used as reinforcement as a single unit.

Devices heretofore devised for reinforcing a diaphragm or seal element have not been readily removeable or retractable from a piling guide when the diaphragm must be subjected to great hydrostatic pressures. In devices of the type heretofore devised, mechanism for locking the reinforcing structure in position has been unduly complicated and when designed to withstand high pressures, the mechanism was difficult to remove or detach from a pipe.

SUMMARY OF INVENTION

The diaphragm closure support system disclosed herein is devised for use in large cylindrical sections where complete closure of the section is required at high hydrostatic pressure. The system comprises a resilient diaphragm element closing the entire cross-section of the cylindrical section to provide a water-tight seal, in combination with, a mechanical support devised to withstand hydrostatic force applied against the diaphragm, the mechanical support being removable from the cylindrical section without necessitating removal of the diaphragm.

A diaphragm support retainer ring, having T-bolt receiving slots formed therein, is welded to the inside of the lower end of the cylindrical section. The diaphragm support is mechanically locked to the retainer ring by retractable T-bolt elements. After obtaining a hydrostatic pressure balance across the diaphragm by controllably flooding the cylindrical section, the support is removed vertically by a wire line. The T-bolts are retracted automatically when lifting force is applied to the wire line.

The T-bolts are pivotally secured to a diaphragm support plate and are urged outwardly into engagement with the T-bolt receiving slots in the diaphragm support retainer ring by a T-bolt retraction and lifting ring. The lifting ring exerts a lateral force to maintain the T-bolts in engagement with the diaphragm support retainer ring while the force resulting from the action of hydrostatic pressure exerted on the diaphragm is in a direction perpendicular to the lateral force exerted by the T-bolt retraction and lifting ring. Thus, a relatively small force can be applied to the wire line to release the support mechanism although the support mechanism, when in a locked position, will resist movement of the diaphragm even though a very high hydrostatic pressure is present on the diaphragm. Since force resulting from application of hydrostatic pressure on the diaphragm is transferred to the wall of the cylindrical section; the load carrying capability of the wall of the cylindrical section, not the diaphragm, is the major design criteria.

After the T-bolts have been unlocked by initial movement of the lifting ring, further movement of the lifting ring results in force being exerted on a lever or crank causing the T-bolts to be retracted to permit removal of the diaphragm closure support system from the cylindrical section. After the diaphragm closure support system has been removed from the cylindrical section, penetration of the remaining diaphragm membrane is easily accomplished by pile weight during normal pile driving operations.

A primary object of the invention is to provide a diaphragm closure support system incorporating a mechanical diaphragm reinforcing structure connectable to the inside of a pipe of large diameter to withstand great hydrostatic force, the support structure being disengageable from the pipe by remote actuation while leaving the diaphragm in position.

Another object of the invention is to provide a diaphragm closure support system incorporating T-bolt elements which are in tension for maintaining a reinforcing plate in an operative position, the T-bolts being maintained in a locked position by rigid compression elements, the component of force being exerted on the compression element being small compared to tension force exerted on the T-bolt locking elements to facilitate disengagement of the T-bolt locking elements from the inner wall of the pipe.

A further object of the invention is to provide a diaphragm closure support system particularly adapted to be disengaged from a tubular piling guide on the ocean floor by exerting force through a wire line from a vessel floating on the water surface to leave an unobstructed passage through which a pile can be moved.

A further object of the invention is to provide a diaphragm closure support system incorporating a plurality of connector members connectable to a support retainer ring in a piling guide wherein each of the connector members is adjustable independently of the other connector members to assure that each connector member engages the retainer ring to equalize loading of the connector members even though the piling guide may not be perfectly round.

A still further object of the invention is to provide a diaphragm closure support system having retractable load carrying connector members which are positively retracted to assure disengagement of the support system from a retainer ring.

A still further object of the invention is to provide a diaphragm closure support system having a kickstand pivotally secured to a retraction and lifting ring to assure that after T-bolt connector members have been retracted they will be locked in a retracted position.

Other and further objects of the invention will become apparent upon referring to the detailed description hereinafter following and to the drawings annexed hereto.

DESCRIPTION OF THE DRAWING

Drawings of a preferred embodiment of the diaphragm closure support system are annexed hereto so that the invention may be better and more fully understood, in which.

Numeral references are employed to designate like parts throughout the various figures of the drawing.

DESCRIPTION OF A PREFERRED EMBODIMENT

Figure 1:
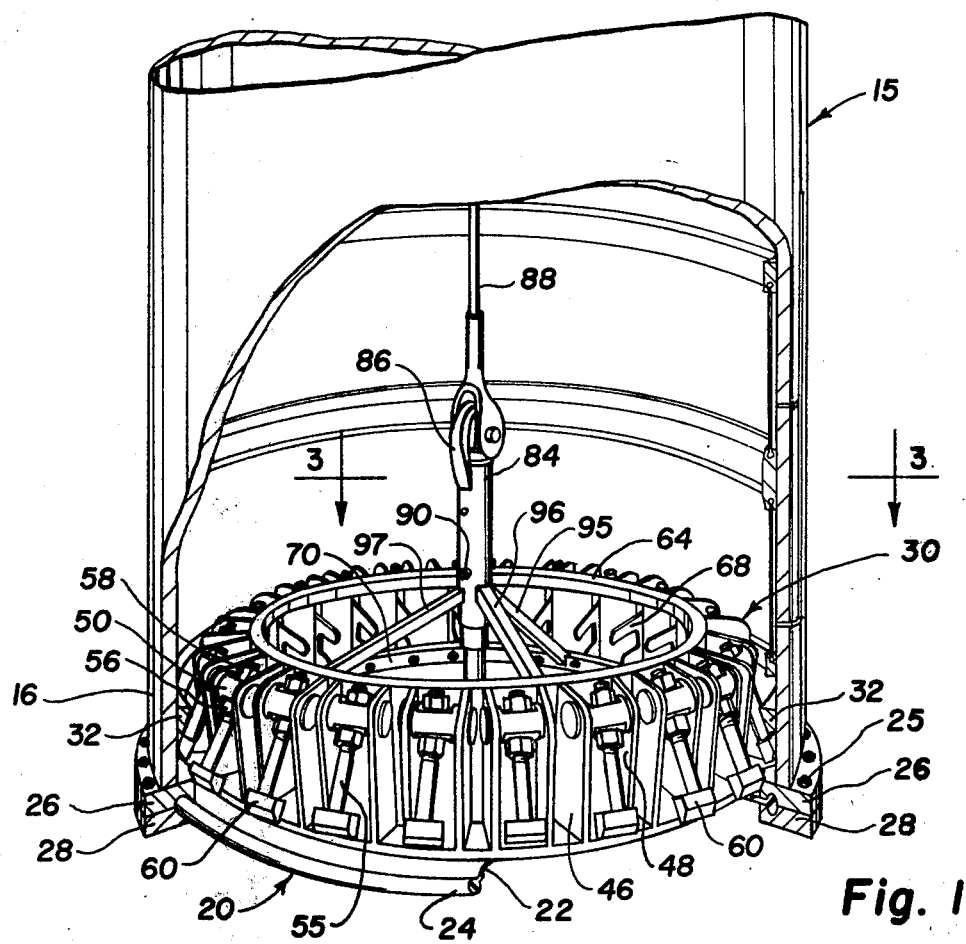
FIG. 1 is a perspective view of the lower end of a pipe having the diaphragm closure support system mounted therein, parts being broken away to more clearly illustrate details of construction.
Figure 2:
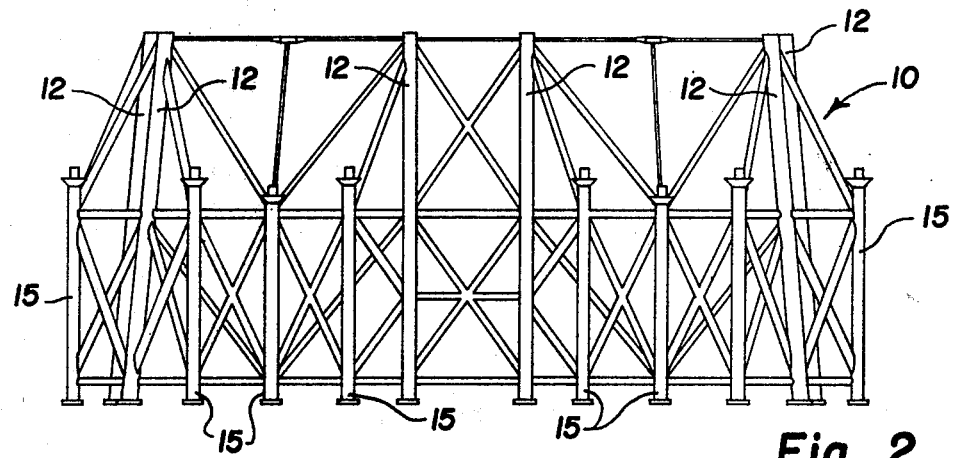
FIG. 2 is a side elevational view of a base section of an offshore drilling platform support structure.

Referring to FIGS. 1 and 2 of the drawing, the numeral 10 generally refers to a lower base section of an offshore drilling platform support structure having a plurality of main legs 12 which are connectable to main legs on other sections of the support structure for constructing a tower-like support structure the lower end of which rests upon the ocean floor. Base section 10 is also provided with piling guides 15 spaced about the outer periphery thereof.

As described in U.S. Pat. No. 3,533,241, upper and lower ends of main legs 12 and piling guides 15 are preferably closed by seal elements so that the massive section can be floated to the drilling site. After the base section 10 has reached the drilling site, portions of legs 12 and piling guides 15 are controllably flooded with water to lower the base section 10 to a desired position on the ocean floor.

The lower end of a piling guide 15 or a main leg 12 and a diaphragm closure element 20 is illustrated in FIG. 1 of the drawing in combination with a diaphragm closure support system 30 associated therewith.

Diaphragm 20 may be constructed of any suitable material such as a sheet of metal welded or otherwise secured to the lower end of piling guide 15, as disclosed in U.S. Pat. No. 3,979,910. However, in the embodiment of the invention illustrated in the drawing, diaphragm 20 comprises a resilient disc 22 having an annular reinforcing element 24 molded in the outer periphery thereof as disclosed in U.S. Pat. No. 3,533,241, the disclosure of which is incorporated herein by reference for all purposes. Diaphragm closure elements of the type generally designated by the numeral 20 are commercially available from Oil States Rubber Company of Arlington, Texas.

Figure 4:
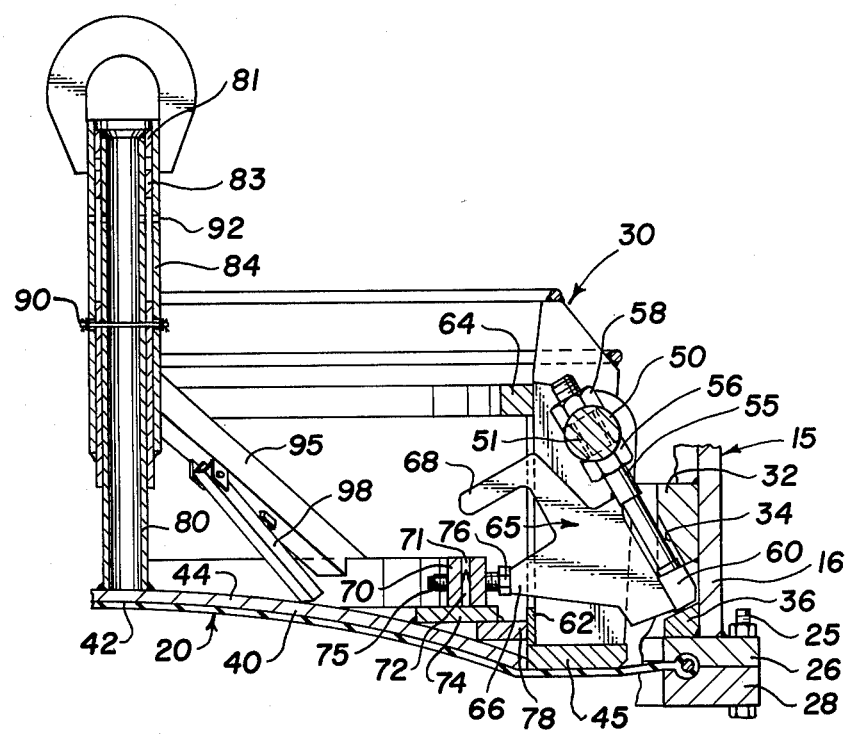
FIG. 4 is a cross-sectional view taken along line 4—4 of FIG. 3.
Figure 5:
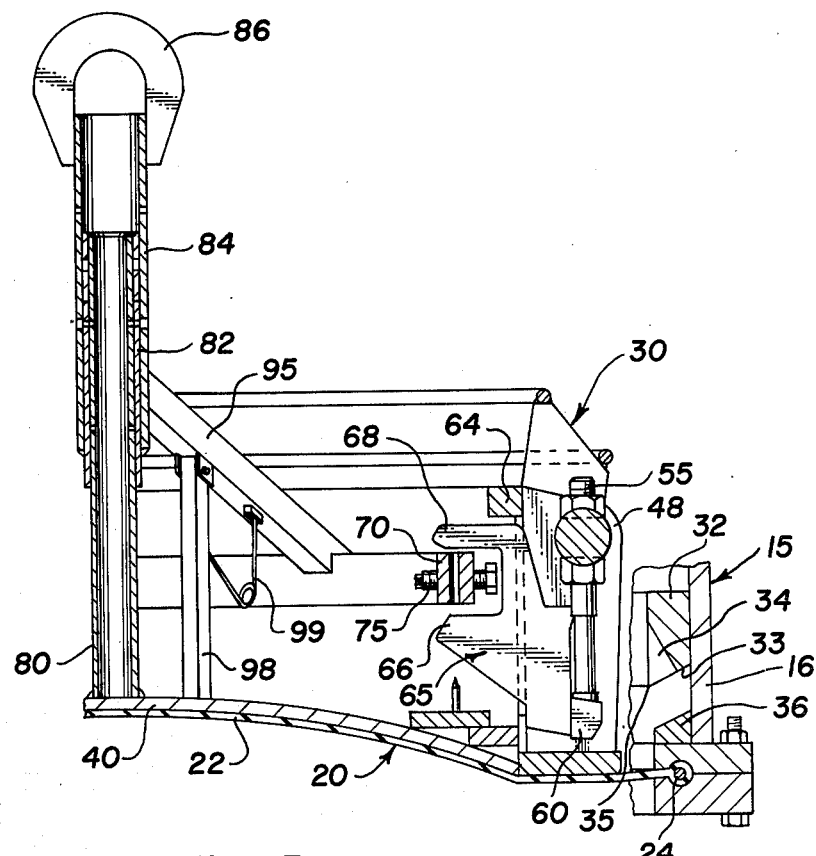
FIG. 5 is a cross-sectional view taken along line 4—4 of FIG. 3, the T-bolt lock elements being illustrated in a retracted position.

Diaphragm 20 is secured to the lower end 16 of piling guide 15 by suitable connector means such as the clamping means illustrated in FIGS. 4 and 5 of the drawing which comprises a first annular plate 26 welded or otherwise secured to the lower end 16 of piling guide 15. A second annular plate 28 is secured by bolts 25 to annular plate 26. Each annular plate 26 and 28 has a semi-circular groove formed therein to clampingly engage the annular reinforcing element 24 extending about the periphery of diaphragm closure element 20.

Figure 3:
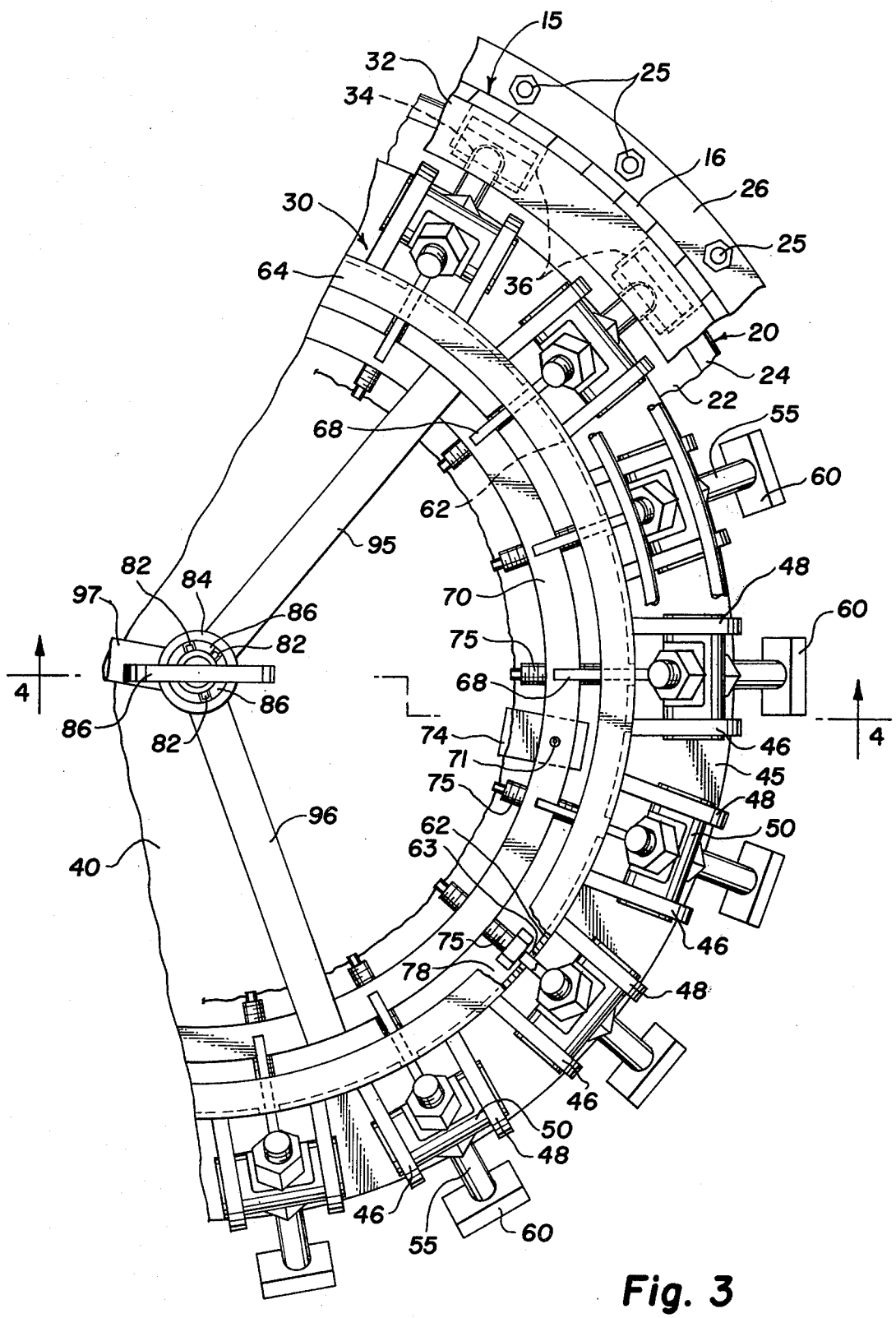
FIG. 3 is a fragmentary cross-sectional view of the diaphragm closure support system taken along line 3—3 of FIG. 1, the T-bolt lock elements being illustrated in an extended position.

As best illustrated in FIGS. 1, 3, and 4 of the drawing, the diaphragm closure support system 30 is secured to the inside of the lower end 16 of piling guide 15 or to the inside of the lower end of one of the main legs 12 to mechanically reinforce diaphragm closure element 20 and to transmit force resulting from application of hydrostatic pressure on diaphragm 20 to the walls of main legs 12 or piling guides 15.

A diaphragm support retainer ring 32 is welded or otherwise secured to the inner wall of piling guide 15. Retainer ring 32 has T-bolt receiving slots 34 formed therein in spaced apart relation about the inner periphery of retainer ring 32. In the particular embodiment of the invention illustrated in the drawing, 18 slots 34 are equally spaced about the periphery of retainer ring 32, each of the slots 34 being spaced approximately 20 degrees apart. Retainer ring 32 is preferably secured to the lower end of piling guide 15 as by welding between slots 34 formed in the retainer ring.

As best illustrated in FIG. 5 of the drawing, the lower surface 33 of retainer ring 32 is bevelled at an angle of, for example 30 degrees, to form an annular shoulder 35 which extends about the lower end of the inner periphery of diaphragm support retainer ring 32.

Lower support pads 36 are secured to the inner wall of the lower end 16 of piling guide 15 and to the upper surface of annular plate 26 below each of the slots 34 formed in diaphragm support retainer ring 32. Upper surfaces of support pads 36 are upwardly inclined to facilitate securing the diaphragm closure support 30 in position, as will be hereinafter more fully explained.

Referring to FIGS. 3 and 4 of the drawing, a diaphragm support plate 40 extends across the lower end of the support sytem 30 and in the illustrated embodiment has a concave lower surface 42 positioned in engagement with the upper surface of diaphragm 20 and a convex upper surface 44 forming a closure for the inside of piling guide 15. A support plate stiffener ring 45 is welded or otherwise secured to the outer edge of support plate 40.

As best illustrated in FIGS. 3 and 4 of the drawing, spaced pairs 46 and 48 of spaced T-bolt assembly mounting plates 46 and 48 are welded or otherwise secured to the upper surface of support plate stiffener ring 45. Each of the mounting plates 46 and 48 has an aperture formed in the upper end thereof in which opposite ends of a pivot pin 50 is rotatably secured. Each pivot pin 50 has a transversely extending passage 51 formed therein in which the upper end of a suitable connector member such as T-bolt 55 is adjustably secured. As best illustrated in FIG. 4 of the drawing, the upper end of T-bolt 55 is externally threaded and lock nuts 56 and 58 are threadedly secured thereto on opposite sides of pivot pin 50.

The lower end of each of the T-bolts 55 has a T-bolt head 60 formed thereon as will be hereinafter more fully explained.

In view of the foregoing it should be readily apparent that each of the T-bolts 50 is rotatably secured between T-bolt assembly mounting plates 46 and 48 and that each T-bolt 55 is adjustable in a longitudinal direction transverse to the axis of pivot pin 50.

Actuating means is provided for controlling the position of T-bolts 55 as will be hereinafter more fully explained.

As best illustrated in FIGS. 3 and 4, a cylindrical stabilizer 62 has a lower end welded or otherwise secured to the upper surface of support plate stiffener 45 and has an outer wall welded or otherwise secured to T-bolt assembly mounting plates 46 and 48. The cylindrical stabilizer 62 has spaced vertically extending passages 63 formed therein and the upper end of cylindrical stabilizer 62 is welded or otherwise secured to a reinforcing ring 64.

The actuating means associated with each of the T-bolts 55 comprises a T-bolt actuating dog 65 comprising a relatively thin, flat plate welded or otherwise secured to each of the T-bolts 55. Each of the dogs 65 has a locking lug 66 formed on a lower portion thereof and a retraction dog 68 formed on an upper portion thereof, as best illustrated in FIGS. 4 and 5 of the drawing.

An annular T-bolt retraction ring 70 has spaced internally threaded openings formed therein through which externally threaded rigging screws 75 extend. Each rigging screw 75 has a head 76 positionable in engagement an end of one of the locking lugs 66 on a T-bolt actuating dog 65.

As will be hereinafter more fully explained, T-bolt retraction ring 70 is moveable vertically relative to T-bolt actuating dogs 65. To facilitate positioning heads 76 on rigging screws 75, a guide pin receiving passage 71 is formed in retraction ring 70 and positionable to receive a guide pin 72 extending upwardly from alignment pads 74.

In the preferred embodiment, three alignment pads, each having a guide pin 72 extending upwardly from the surface thereof, are welded to the upper surface 44 of diaphragm support plate 40 and to an annular ring 78 which is welded to the upper surface of diaphragm support plate 40 and to the lower end of the inner wall of cylindrical stabilizer 62. Thus, the spaced alignment pads 74 define a bearing surface upon which T-bolt retraction ring 70 is supported in the position illustrated in FIG. 4 of the drawing.

As best illustrated in FIG. 4, the lower end of a guide post 80 is welded or otherwise secured to a central portion of diaphragm support plate 40. Guide post 80 has spaced guide members 82 welded or otherwise secured to the outer surface thereof which extend into the hollow portion of tubular guide sleeve 84 having guide members 86 welded or otherwise secured to the inner wall thereof adjacent opposite sides of each of the guide members 82 for preventing rotation of guide sleeve 84 relative to guide post 80.

A lifting eye 86 is secured to the upper end of guide sleeve 84 to facilitate actuating the diaphragm closure support system by a cable or wire line 88.

As best illustrated in FIGS. 3 and 4 of the drawing, three spokes 95, 96 and 97 have upper ends welded or otherwise secured to guide sleeve 84 and have lower ends secured to T-bolt retraction ring 70.

When heads 76 on rigging screws 75 are in engagement with locking lugs 66 on actuating dogs 65, the lower ends of T-bolts 55 are positioned in slots 34 in the diaphragm support retainer ring 32. Heads 60 on T-bolts 55 are moveable into engagement with the lower surface 33 on retainer ring 32 by adjustment of lock nuts 56 and 58 and by adjustment of rigging screws 75. When each T-bolt 55 is properly positioned, a shear pin 90 is positioned through aligned apertures formed in guide sleeve 84 and guide post 80. A rigging pin 92 is positioned through aligned apertures in post 80 and guide sleeve 84 to facilitate handling the diaphragm closure support system 30 without fracturing shear pin 90. However, rigging pin 92 is removed after the device is installed in the lower end of piling guide 15.

One or more of the spokes 95, 96, 97 have a bar 98 pivotally secured thereto, for example by a pin extending through aligned apertures in lugs welded to the spoke 95 and in the upper end of bar 98. A spring 99 has one end secured to spoke 95 and another end secured to bar 98 to resiliently urge the lower end of bar 98 toward guide post 80.

When T-bolt retraction ring 70 has moved upwardly relative to support plate 40 to the position shown in FIG. 5, the bar 98 functions as a kickstand to prevent downward movement of retraction ring 70. Thus, the kickstand 98 locks actuating dogs 65 and T-bolts 55 in a retracted position.

The operation and function of the apparatus hereinbefore described should be readily apparent. After diaphragm 20 has been secured in position between annular plates 26 and 28, the diaphragm closure support system 30 is positioned and T-bolts 55 are moved to the position illustrated in FIG. 4 of the drawing, lock nuts 56 and 58 and rigging screw 75 being adjusted as hereinbefore described for adjusting the position of each T-bolt 55 relative to each of the other T-bolts.

When in position, hydrostatic pressure exerted on the lower surface of diaphragm 20 exerts an upwardly directed force on support plate 40. Thus, T-bolts 55, when in the position illustrated in FIG. 4, are in tension and movement of diaphragm support plate 40 is restrained by the engaging lower surface 33 on diaphragm support retainer ring 33 and upper surfaces of heads 60 on T-bolts 55. In view of the angle of inclination of the lower surface 33, heads 60 on T-bolts 55 can not move inwardly past shoulder 35 when hydrostatic pressure applied against diaphragm 20 is increased. The horizontal component of the force exerted by rigging screw 75 on dog 65 is relatively small compared to the vertical component of the force exerted by application of hydrostatic pressure on diaphragm 20.

For removal of the diaphragm closure support system 30 from inside pile closure 15, the pile guide 15 is flooded with water to equal hydrostatic pressure on opposite sides of diaphragm 20. However, it should be appreciated that when base section 10 is resting on the ocean floor, mud may exert a substantial force on diaphragm 20 so that it may be impossible to relieve tension force in T-bolts 55 by flooding the piling 15.

An upward force on cable 88 will fracture shear pin 90 and will allow guide sleeve 84 to move vertically along post 80 until stop elements 81 and 83 move into engagement. As guide sleeve 84 moves vertically from the position shown in FIG. 4 to the position shown in FIG. 5, T-bolt retraction ring 70 moves vertically. As retraction ring 70 moves vertically, heads 76 on rigging screws 75 move out of engagement with locking lugs 66 on dogs 65 and move into engagement with lower surfaces on retraction dogs 68 thereby causing T-bolts 55 and locking dogs 65 to move to the position illustrated in FIG. 5. When in the position illustrated in FIG. 5, the heads 60 on T-bolts 55 are moved inwardly to a position between T-bolt assembly mounting plates 46 and 48. As illustrated in FIG. 5, upper ends of T-bolt mounting plates 46 and 48 extend above the upper surface of diaphragm support retainer ring 32. T-bolts 55 are nested between plates 46 and 48 to assure that vertical movement of the diaphragm closure support system 30 will not result in movement of heads 60 on T-bolts 55 into engagement with shoulder 35 on the diaphragm support retainer ring 32 or any other structure thereabove in piling guide 15.

After T-bolts 55 have been retracted to the position illustrated in FIG. 5, the entire assembly 30 can be lifted vertically through piling guide 15 and lifted to the surface of the water for reuse in another operation.

Having described our invention, we claim:

1. An offshore drilling platform support structure having a plurality of hollow tubular piling guides secured thereto and a diaphragm closing opposite ends of said piling guides to control flow of water into the piling guides, the improvement comprising: retainer means secured to the inner wall of the piling guide; a diaphragm support plate positionable to engage the diaphragm; connector means moveably secured to said diaphragm support plate, said connector means being moveable between an extended position engaging said retainer means and a retracted position spaced from said retainer means; and retraction means moveably secured to said diaphragm support plate, said retraction means being arranged to move said connector means from said extended position to said retracted position to permit removal of said diaphragm support plate from engagement with the diaphragm.

2. An offshore drilling platform support structure according to claim 1, said retainer means comprising a diaphragm support retainer ring having spaced slots formed about the inner periphery thereof and an annular shoulder extending about the lower end thereof adjacent the inner periphery.

3. An offshore drilling platform support structure according to claim 2, said connector means comprising a plurality of connector members, each of said connector members having an enlarged head portion adjacent the lower end thereof; and means pivotally securing each of said connector members to said diaphragm support plate such that the enlarged head portions on each of the connector members are pivotable between an extended position wherein one of said connector members is received in one of said slots in said diaphragm support retainer ring and the enlarged head portion is positioned adjacent the annular shoulder on the diaphragm support retainer ring.

4. An offshore drilling platform support structure according to claim 3, said retraction means comprising a retraction ring; means moveably securing said retraction ring to said diaphragm support plate; and actuating means secured to each of said connector members and associated with said retraction ring, said actuating means being adapted to maintain said connector members in said extended position until said retraction ring is moved relative to said diaphragm support plate.

5. An offshore drilling platform support structure according to claim 4, said actuating means having a retraction dog extending outwardly therefrom and positioned to be engaged by said retraction ring for movement of said head portions on said connector members to said retracted position.

6. An offshore drilling platform support structure according to claim 5, said means pivotally securing each of said connector members to said diaphragm support plate comprising: spaced mounting plates secured to said diaphragm support plate; a pivot pin pivotally secured between said mounting plates; and means adjustably securing said connector member to said pivot pin such that the head portion on said connector member is adjustable in a direction transverse to the axis of the pivot pin.

7. An offshore drilling platform support structure according to claim 6 with the addition of: a kickstand pivotally secured to said retraction ring; and means resiliently urging said kickstand to a position to prevent movement of said retraction ring downwardly relative to said diaphragm support plate after said retraction ring has moved into engagement with said retraction dog.

8. A diaphragm support system for use in a tubular member in which a diaphragm closes at least one end of said tubular member, the improvement comprising: retainer means secured to the inner wall of the tubular member; a diaphragm support plate positionable to engage the diaphragm; connector means moveably secured to said diaphragm support plate, said connector means being moveable between an extended position engaging said retainer means and a retracted position spaced from said retainer means; and retraction means moveably secured to said diaphragm support plate, said retraction means being arranged to move said connector means from said extended position to said retracted position to permit removal of said diaphragm support plate from engagement with the diaphragm.

* * * * *